US011005345B2

(12) United States Patent
Senda et al.

(10) Patent No.: US 11,005,345 B2
(45) Date of Patent: May 11, 2021

(54) PUNCH PROCESSING METHOD FOR ELECTRICAL STEEL SHEETS AND METHOD FOR MANUFACTURING LAMINATED CORE

(71) Applicant: JFE STEEL CORPORATION, Tokyo (JP)

(72) Inventors: Kunihiro Senda, Tokyo (JP); Masanori Uesaka, Tokyo (JP); Yoshihiko Oda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 272 days.

(21) Appl. No.: 16/335,949

(22) PCT Filed: Aug. 22, 2017

(86) PCT No.: PCT/JP2017/029944
§ 371 (c)(1),
(2) Date: Mar. 22, 2019

(87) PCT Pub. No.: WO2018/061529
PCT Pub. Date: Apr. 5, 2018

(65) Prior Publication Data
US 2019/0312495 A1    Oct. 10, 2019

(30) Foreign Application Priority Data

Sep. 29, 2016    (JP) .............................. JP2016-191028

(51) Int. Cl.
*H01F 3/04*    (2006.01)
*H02K 15/02*    (2006.01)
(Continued)

(52) U.S. Cl.
CPC ............. *H02K 15/02* (2013.01); *B21D 28/02* (2013.01); *B21D 28/26* (2013.01); *H01F 41/02* (2013.01);
(Continued)

(58) Field of Classification Search
USPC ........... 29/609, 90.01, 283.5, 525, 596, 598, 29/602.1
See application file for complete search history.

(56) References Cited

U.S. PATENT DOCUMENTS 7,002,277 B2    2/2006  Yamamoto et al.
7,743,484 B2    6/2010  Fukumaru et al.
(Continued)

FOREIGN PATENT DOCUMENTS

CN    1422450 A    6/2003
CN    1578058 A    2/2005
(Continued)

OTHER PUBLICATIONS

Apr. 7, 2020 Extended European Search Report issued in European Patent Application No. 17855487.9.
(Continued)

*Primary Examiner* — Thiem D Phan
(74) *Attorney, Agent, or Firm* — Oliff PLC

(57) ABSTRACT

A punch processing method for electrical steel sheets to manufacture core segments includes: stacking a plurality of electrical steel sheets; and punching out the plurality of electrical steel sheets in a stacked state simultaneously to manufacture the core segments, wherein in a case where the core segments are applied to a stator core in which a maximum magnetic flux density at a tooth portion is to be higher than a maximum magnetic flux density at a back yoke portion, degrees of Vickers hardness of an electrical steel sheet located second from a bottom side and above in the
(Continued)

stacked state are set to 180 HV or higher, and 10 HV or higher than a value of degree of Vickers hardness of an electrical steel sheet located on the bottom side in the stacked state.

2 Claims, 2 Drawing Sheets

(51) Int. Cl.
*B21D 28/02* (2006.01)
*B21D 28/26* (2006.01)
*H01F 41/02* (2006.01)

(52) U.S. Cl.
CPC .......... *H01F 41/0233* (2013.01); *Y10T 29/49* (2015.01); *Y10T 29/49075* (2015.01); *Y10T 29/49078* (2015.01)

(56) References Cited

U.S. PATENT DOCUMENTS

| | | | |
|---|---|---|---|
| 7,870,661 B2 | 1/2011 | Nishizawa et al. | |
| 7,926,164 B2 | 4/2011 | Rau et al. | |
| 8,108,988 B2 | 2/2012 | Nishizawa et al. | |
| 9,533,805 B2 | 1/2017 | McLean et al. | |
| 2003/0151327 A1 | 8/2003 | Ramirez | |
| 2005/0023925 A1 | 2/2005 | Yamamoto et al. | |
| 2005/0229382 A1 | 10/2005 | Yamamoto et al. | |
| 2005/0229384 A1 | 10/2005 | Yamamoto et al. | |
| 2006/0001328 A1 | 1/2006 | Rau et al. | |
| 2008/0048529 A1 | 2/2008 | Shimoyama | |
| 2008/0169286 A1 | 7/2008 | McLean et al. | |
| 2008/0307634 A1 | 12/2008 | Nishizawa et al. | |
| 2009/0038146 A1 | 2/2009 | Nishizawa et al. | |
| 2009/0056103 A1 | 3/2009 | Fukumaru et al. | |
| 2014/0001185 A1 | 1/2014 | McLean et al. | |
| 2017/0040850 A1 | 2/2017 | Hashimoto | |
| 2017/0173930 A1 | 6/2017 | McLean et al. | |
| 2018/0001369 A1* | 1/2018 | Senda | H01F 41/061 |
| 2018/0355450 A1* | 12/2018 | Lee | C22C 38/02 |

FOREIGN PATENT DOCUMENTS

| | | |
|---|---|---|
| CN | 1783667 A | 6/2006 |
| CN | 1902801 A | 1/2007 |
| CN | 101119053 A | 2/2008 |
| CN | 101160211 A | 4/2008 |
| CN | 101296776 A | 10/2008 |
| CN | 106451827 A | 2/2017 |
| JP | S55-156623 A | 12/1980 |
| JP | 2003-153503 A | 5/2003 |
| JP | 2003-189514 A | 7/2003 |
| JP | 2005-261038 A | 9/2005 |
| JP | 2005-348456 A | 12/2005 |
| JP | 2009-71994 A | 4/2009 |
| JP | 2011-109834 A | 6/2011 |
| JP | 2012-115893 A | 6/2012 |
| JP | 2012-115894 A | 6/2012 |
| WO | 2016/114212 A1 | 7/2016 |

OTHER PUBLICATIONS

May 20, 2020 Office Action issued in Chinese Patent Application No. 201780058949.9.

Nov. 7, 2017 International Search Report issued in International Patent Application No. PCT/JP2017/029944.

* cited by examiner

PUNCH PROCESSING METHOD FOR ELECTRICAL STEEL SHEETS AND METHOD FOR MANUFACTURING LAMINATED CORE

FIELD

The present invention relates to a punch processing for electrical steel sheets and a method for manufacturing a laminated core.

BACKGROUND

In recent years, in order to reduce weights of motors and generators of mainly electric vehicles and hybrid electric vehicles, each of the motors and the generators has been intended to have a smaller core. Further, the rotational speed (frequency) of the motor and the generator is increased to ensure outputs thereof. Consequently, from the viewpoint of reducing the core loss of the core, a demand is increasing for an electrical steel sheet having a thickness of 0.30 mm or smaller that is smaller than before.

The core of the motor and the generator is manufactured by using, as a base material, an electrical steel sheet having a small thickness for reducing the core loss, and by punch processing the electrical steel sheet. In the punch processing, a core is manufactured by: setting a processing die in a pressing machine; punching out parts of the core while the base material that has been slit into a predetermined width is being fed by a coil feeder; and integrating the parts of the core by crimping inside the die, or by taking out core segments (electrical steel sheets after punch processing and before being integrated together into the core) on which the punch processing is performed from the die and integrating the core segments by welding or by fastening with bolts. The core manufactured by stacking the electrical steel sheets having a small thickness and integrating them together as described above is called a "laminated core".

In an industrial manufacturing process of the laminated core, the following method is generally employed. The manufacturing process includes a plurality of processes having different dies and punches corresponding to the processes. The base material is sequentially fed to the next pressing process to form a shape of the core, and the periphery of the core is punched out in the final pressing process to separate a core segment from the base material. In an industrial production of the core using the crimping technique, a method is also employed in which the core materials are separated from the base material in a final pressing process, and then, are integrated together into the laminated core by fitting crimping projections with each other using a descending operation of a punch. FIG. 3 illustrates such a punch processing. FIG. 3 is a schematic view illustrating an example of the punch processing using a progressive die. In the example illustrated in FIG. 3, a slot portion 12 is first punched out from a base material S while leaving behind a portion corresponding to a tooth portion 11 of a core, and then, a central portion 13 of the core is punched out. An outer peripheral portion of a back yoke portion 14 of the core is punched out to form each of a plurality of core segments 15, and the plurality of core segments 15 are integrated together to manufacture a laminated core 16. In FIG. 3, reference numeral 17 represents a scrap of the base material S generated in the punch processing.

The pressing process as described above is generally used because of being excellent in productivity. However, in the normal punch processing, the core segments need to be punched out one by one. As a result, the efficiency rapidly drops with reduction in thickness of the base material. Therefore, as a way of solving such a problem, a technique has been proposed where a plurality of base materials are punched out in a stacked state, and a solution to accompanying problems have further been proposed. For example, to solve a problem of misalignment between base materials when the plurality of base materials are stacked and simultaneously fed into the die, methods have been proposed in which the base materials are fixed to each other by, for example, crimping in a process during an initial period of the pressing process in the die before the punch processing is performed (refer to Patent Literatures 1 and 2).

A method has also been proposed in which combination locking portions are formed to fix the base materials to each other, and in addition, the projections are flattened using a push back process to prevent the projecting shapes of the combination locking portions from being obstacles in a lamination process (refer to Patent Literature 3). All these conventional techniques provide countermeasures against the problem of deterioration in accuracy of dimensions when the plurality of base materials are simultaneously punched out. Furthermore, methods have also been proposed in which a die including inside a plurality of portions corresponding to punches and dies can simultaneously perform the punch processing on the plurality of base materials in one pressing process while preventing droops and burrs from increasing (refer to Patent Literatures 4 and 5).

CITATION LIST

Patent Literature

Patent Literature 1: Japanese Patent Application Laid-open No. 55-156623

Patent Literature 2: Japanese Patent Application Laid-open No. 2003-153503

Patent Literature 3: Japanese Patent Application Laid-open No. 2005-261038

Patent Literature 4: Japanese Patent Application Laid-open No. 2012-115893

Patent Literature 5: Japanese Patent Application Laid-open No. 2012-115894

Patent Literature 6: Japanese Patent Application Laid-open No. 2005-348456

SUMMARY

Technical Problem

When the base materials are stacked and simultaneously punched out, problems occur where magnetic characteristics of the core deteriorate and the burrs increase. It is generally known that, since a punched end portion is subjected to a strong plastic deformation in the punch processing, a plastic strain remains near the punched end portion, and magnetic characteristics deteriorate. Since the quantitative evaluation of the amount of deterioration in the magnetic characteristics cannot be explained only by the plastic strain, a residual elastic strain associated with the plastic deformation is also considered to affect the deterioration in the magnetic characteristics. In this way, although being excellent in productivity, the punch processing has a problem of deteriorating the magnetic characteristics of the core. When the punch processing is performed on the stacked base materials, the plastically deformed portion widely spreads because constraining forces between the stacked base materials are smaller. As a result, the magnetic characteristics deteriorate and the motor is made low in characteristics (efficiency) compared with when the punch processing is performed on the base materials one by one.

In the above-described conventional techniques of the methods of punch processing the stacked base materials, the focus is put only on the deterioration in accuracy of dimensions of the core and the increase in the burrs caused by the punch processing, and no improvement measures have been proposed on the deterioration in the magnetic characteristics of the core. In addition, no simple and effective measure can be said to have been proposed as a measure against the increase in the burrs. Patent Literature 3 proposes a method in which, in a case where a plurality of base materials are stacked and the punch processing on the base materials are performed simultaneously, the combination locking portions are provided on the base materials before performing the punch processing, and are pressed to be flattened by a push-back mechanism to prevent the lamination factor from decreasing when the base materials are laminated. This method does not take into account the problem on which the present invention focuses, that is, the problem of the deterioration in the core magnetic characteristics associated with the punch processing in the laminated state, and also requires extra processing of the push back process. As a result, the die structure is complicated, and the method is disadvantageous in cost and maintenance. In addition, to fix the base materials to each other, portions other than the combination locking portions need to be crimped. Therefore, the deterioration in the magnetic characteristics of the core is unavoidable in consequence of the processing of both the combination locking portions and crimps.

In the techniques described in Patent Literatures 4 and 5, since the punching out is not performed in the state in which the base materials are directly stacked, the techniques are advantageous in the problems of the deterioration in the magnetic characteristics and the increase in the burrs, but are disadvantageous in that the die cost significantly increases because the die structure is complicated. In addition, no method is presented to efficiently stack and integrate together the core segments punched out by the punches and dies. Patent Literature 6 disclose a method in which, when the base materials are stacked and the punch processing is performed, end faces in the longitudinal direction thereof are welded together, or a semi-cured resin is used to bond together 80% or more of the base materials in adhesion layers having a thickness of 3 µm or more, and then the punch processing and the crimping are simultaneously performed. However, this method has a problem in productivity and manufacturing cost because the processing needs to be applied to wide areas, such as the end faces in the longitudinal direction of the base materials and 80% or more of the base material surfaces.

In the punch processing of the stacked base materials, the burrs tend to be larger in portions where the base materials are stacked on each other. The increase in the burrs indicates that the amounts of deformation of the ends of the base materials are large, and leads to the deterioration in the magnetic characteristics of the core. Therefore, from the various viewpoints described above, it can be said to be an important object to restrain the increase in height of the burrs generated at inside portions of the laminated base materials in the punch processing in the stacked state.

The present invention has been made in view of the problem described above, and an object thereof is to provide a punch processing method for electrical steel sheets and a method for manufacturing a laminated core that are capable of restraining the increase in the burrs that leads to the deterioration in the magnetic characteristics.

Solution to Problem

To solve the problem and achieve the object, a punch processing method for electrical steel sheets according to the present invention is a method for manufacturing core segments by punching out, simultaneously, a plurality of electrical steel sheets in a stacked state, wherein in a case where the core segments are applied to a stator core in which a maximum magnetic flux density at a tooth portion is to be higher than a maximum magnetic flux density at a back yoke portion, degrees of Vickers hardness of an electrical steel sheet located second from a bottom side and an electrical steel sheet located above the electrical steel sheet located second from the bottom side, in the stacked state, are set to 180 HV or higher, and 10 HV or higher than a value of degree of Vickers hardness of an electrical steel sheet located on the bottom side in the stacked state.

Moreover, a punch processing method for electrical steel sheets according to the present invention is a method for manufacturing core segments by punching out, simultaneously, a plurality of electrical steel sheets in a stacked state, wherein in a case where the core segments are applied to a stator core in which a maximum magnetic flux density at a back yoke portion is to be higher than a maximum magnetic flux density at a tooth portion, degrees of Vickers hardness of an electrical steel sheet located second from a top side and an electrical steel sheet located below the electrical steel sheet located second from the top side, in the stacked state, are set to 180 HV or higher, and 10 HV or higher than a value of degree of Vickers hardness of an electrical steel sheet located on the top side in the stacked state.

Moreover, a method for manufacturing a laminated core according to the present invention includes: manufacturing the laminated core by laminating and integrating the core segments manufactured using the punch processing method for electrical steel sheets according to the present invention.

Advantageous Effects of Invention

A punch processing method for electrical steel sheets and a method for manufacturing a laminated core according to the present invention are capable of restraining the increase in the burrs that leads to the deterioration in the magnetic characteristics.

DESCRIPTION OF EMBODIMENTS

As a result of keen studies, the inventors of the present invention have reached an idea of manufacturing a core excellent in magnetic characteristics and having smaller burrs by using, from the viewpoint of restraining deterioration in the magnetic characteristics and increase in the burrs, materials having different degrees of hardness as stacked electrical steel sheets for use instead of using electrical steel sheets having the same degree of hardness, and also by optimizing the arrangement of the materials in a punch processing taking into account the processing mode of the core and the magnetization state of the core in a motor. The following describes circumstances that lead to the idea of the present invention.

Figure 1:
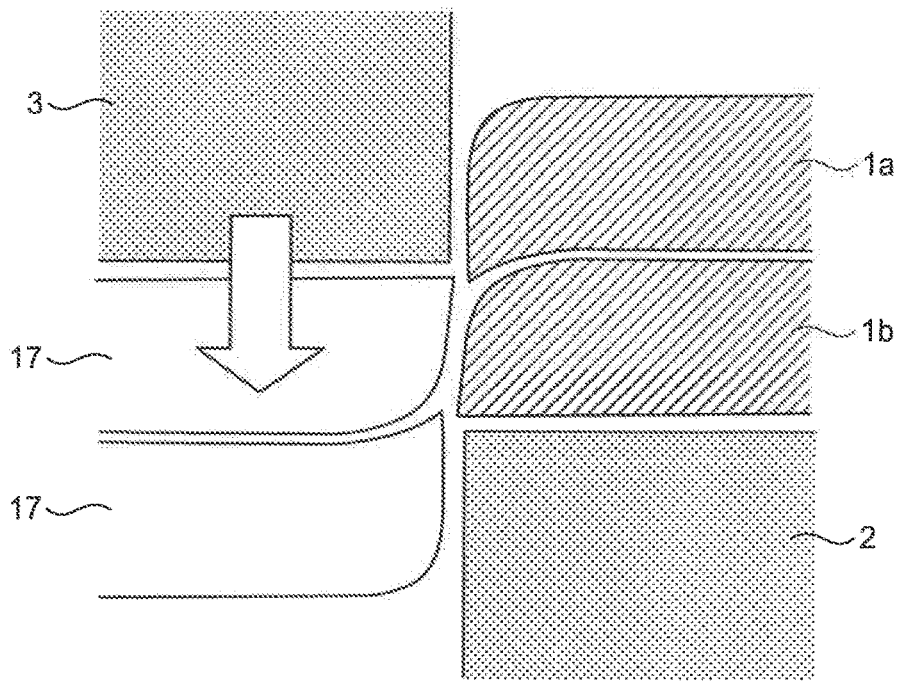
FIG. 1 is a schematic view illustrating a punch processing in a state in which a plurality of electrical steel sheets are stacked in a case where core segments remain on a die.
Figure 2:
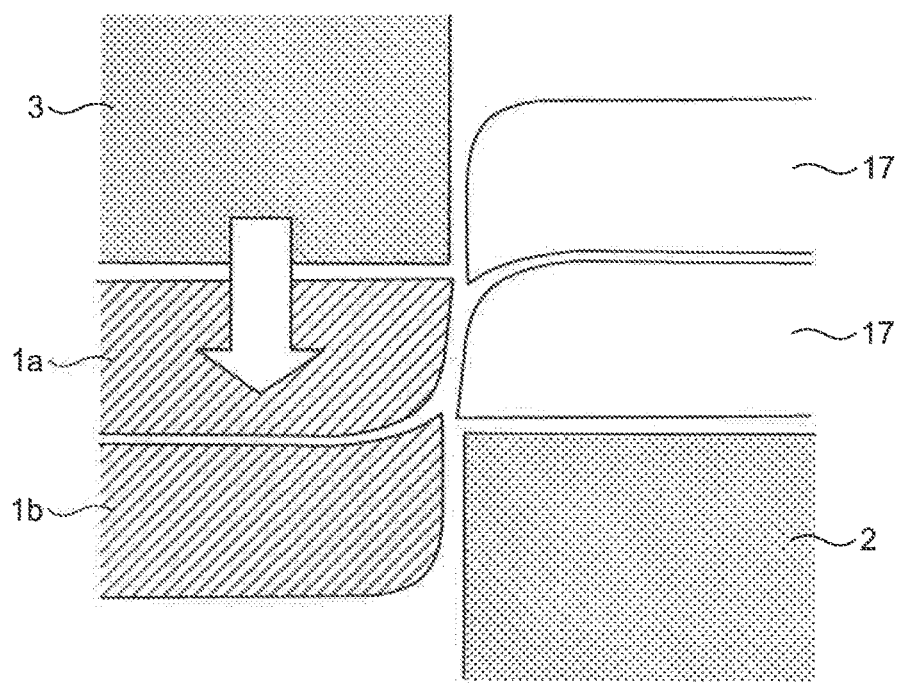
FIG. 2 is a schematic view illustrating the punch processing in the state in which the electrical steel sheets are stacked in a case where the core segments are punched out by a punch.

In the punch processing, the materials fracture while being drawn into a clearance (gap between a punch having descended and a die), and the punch processing (shearing process) ends. In such a case, a plastic strain and an elastic strain associated with a macroscopic plastic flow remain at a punched end portion, which causes the deterioration in the magnetic characteristics of the core. In particular, when a plurality of electrical steel sheets are stacked and the punch processing is performed, residual amounts of the strains are larger at portions in laminated layers where constraining forces are smaller, and as a result, this causes core loss deterioration of the entire core. The burrs increase at portions where sides thereof subjected to the shearing process are not in contact with the die or the punch. FIGS. 1 and 2 illustrate such a situation.

Figure 3:
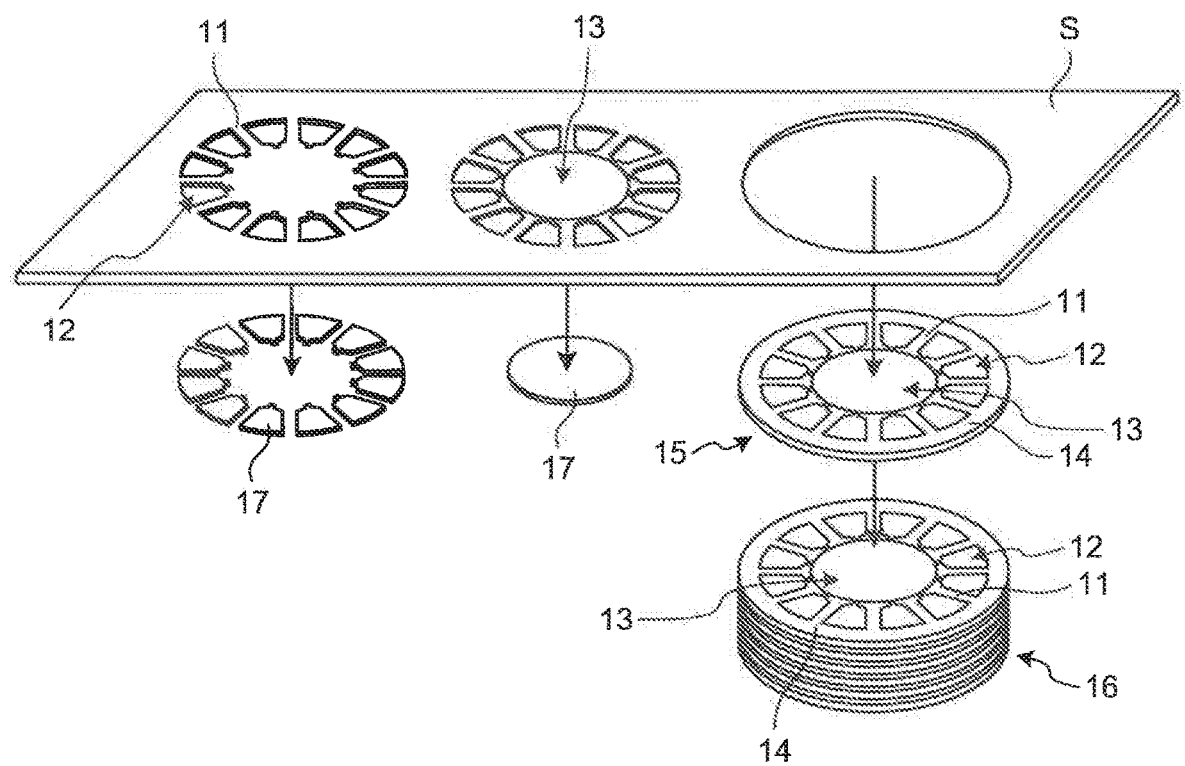
FIG. 3 is a schematic view illustrating an example of the punch processing using a progressive die.

FIG. 1 is a schematic view illustrating a process in which a portion finally to be the core (portion shaded with oblique lines) remains on the die in the punch processing in the state in which the electrical steel sheets are stacked, and FIG. 1 corresponds to the punch processing of the slot portion 12 illustrated in FIG. 3. As illustrated in FIG. 1, in such a punch processing, a descending punch 3 first comes in contact with an upper electrical steel sheet (above an electrical steel sheet 1a at the second from the bottom), and deformation progresses while forming a droop on the upper surface of the upper electrical steel sheet. Since the upper electrical steel sheet and the lower electrical steel sheet are not constrained therebetween, large burrs are generated on the lower side of the upper electrical steel sheet, and this makes the droop of the lower electrical steel sheet larger. In addition, since an electrical steel sheet 1b on the lowest side of the stacked electrical steel sheets is in contact with a die 2, the amount of the generated burrs is smaller. FIG. 2 is a schematic view illustrating a process in which the portion finally to be the core (portion shaded with oblique lines) is punched out by the punch and pushed into the die in the punch processing in the stacked state, and FIG. 2 corresponds to the punch processing of the outer peripheral portion of the back yoke portion 14 illustrated in FIG. 3. In such a punch processing, of core segments consisting of the two stacked electrical steel sheets 1a and 1b, the lower electrical steel sheet 1b has burrs made larger, and the droop of the upper electrical steel sheet 1a is made larger along with the generation of these burrs.

As described above, in the punch processing of the stacked electrical steel sheets, the burrs are smaller in the electrical steel sheet directly in contact with the die (the punch or the die) among the core segments, and the burrs are larger in the electrical steel sheet farther from a portion in contact with the die (the punch or the die) among portions where the electrical steel sheets are in contact with each other. Since the increases in the burrs and the droops correspond to the increase in the amount of deformation at ends of the electrical steel sheets, the magnetic characteristics of the core segments deteriorate with the increase in the burrs. It is known that, in the punch processing of the electrical steel sheets, the amount of the generated burrs is smaller in materials having higher degrees of hardness. The present invention has been conceived based on the knowledge that the increases in the burrs and the droops can be restrained by applying the above-described nature to the punch processing in the stacked state. In other words, a material having a higher degree of hardness is used as an electrical steel sheet on a side where the burrs are more likely to increase so as to restrain the increase in the burrs in this electrical steel sheet and to restrain the increase in the droops in an electrical steel sheet adjacent thereto. These effects can prevent the deformed area at the punched end portion from increasing, and can prevent the deterioration in the magnetic characteristics.

If all the stacked electrical steel sheets are materials having higher degrees of hardness, when the electrical steel sheets are stacked and are tried to simultaneously perform the punch processing, the total deformation resistance exceeds the capacity of the pressing machine, and the processing cannot be performed in some cases because high-hardness materials have high deformation resistance during the processing. Since the high-hardness materials contain a large amount of additive elements and have various manufacturing difficulties, the high-hardness materials are high-priced. Therefore, making the entire core out of the high-hardness materials leads to an excessive increase in material price. Accordingly, when the magnetic characteristics of the core, the capacity of the pressing machine for performing the punch processing, and the prices of the materials of the core are all tried to be simultaneously satisfied, it is better to optimally arrange the materials having different degrees of hardness based on the present invention and to perform the punch processing than to use the high-hardness materials for all the materials.

By applying the present invention to the method of manufacturing the core by feeding the electrical steel sheets into the die for the punch processing set on the pressing machine and performing the punch processing on the electrical steel sheets, the core excellent in core loss characteristics can be produced at a high efficiency. In particular, by being applied to the punch processing using a progressive die illustrated in FIG. 3, the present invention effectively contributes to achievement of a high production efficiency.

The present invention is applicable to the electrical steel sheets each having a thickness of approximately 0.05 mm to approximately 0.50 mm, and can improve the productivity by stacking and simultaneously performing the punch processing on the electrical steel sheets. In the present invention, the electrical steel sheets that are stacked and the punch processing is performed have different materials (in degrees of hardness), and need not have the same thickness. A plurality types of electrical steel sheets having different thicknesses can be used.

As illustrated in FIG. 3, in the manufacturing of the core, the punch processing die first performs the processing such that the portion to finally be the core remains on the die, and finally performs the punch processing on the outer peripheral portion of the core such that the core is separated from the base material. Accordingly, the processed portion corresponding to the portion shaded with oblique lines in each of FIGS. 1 and 2 is present in the core.

The deterioration in the magnetic characteristics of the punched end portion needs to be prevented at a portion in the core where the magnetic flux density is highest when the core is used in a motor. The magnetic permeability (in a low flux density area) decreases and the core loss increases at a portion where the strain caused by the punch processing remains. The magnetic permeability is reduced by the strain caused by the punch processing at the portion in the core where the average magnetic flux density is lower, and the magnetic flux density decreases at the punched end portion of such a portion. Therefore, the increase in the core loss is more restrained than a case where the magnetic flux density is evenly distributed. In contrast, the magnetic flux density increases at a portion in the core, including the vicinity of the end with the residual strain caused by the punch processing, where the average magnetic flux density is higher. Therefore, the core loss significantly increases at the punched end portion of such a portion. Specific examples of such a portion include a tooth portion of a stator core. Since the maximum magnetic flux density is particularly higher at the tooth portion of a brushless direct current (DC) motor, the core loss is significantly increased by the punch processing.

In the process illustrated in FIG. 3, the tooth portion 11 remains on the die during the processing, and a side portion of the tooth portion 11 is formed by the punch processing illustrated in FIG. 1. Therefore, in the punch processing in the stacked state, when the degree of hardness of the upper electrical steel sheet is increased, the burrs at the side portion of the tooth portion 11 of the upper electrical steel sheet are restrained from increasing in the punch processing of the slot portion 12 for forming the tooth portion. As a result, the droops of the lower electrical steel sheet are restrained from increasing. Consequently, the magnetic characteristics are prevented from deteriorating in punching out in the stacked state.

As described above, in many motors, to restrain the core loss deterioration at the tooth portion where the magnetic flux density is highest and that is likely to be affected by the core loss deterioration caused by the punch processing, materials having higher degrees of hardness are recommended to be used as the electrical steel sheets that are second lowest and higher with respect to the lowermost electrical steel sheet. Depending on the motor or generator, the magnetic flux density is at the maximum at the back yoke portion of the stator core in some cases. In such a case, since the back yoke portion at the outermost periphery comes in contact with the punch in the punch processing in the mode illustrated in FIG. 2, a desired effect can be obtained by using the materials having higher degrees of hardness as the electrical steel sheets that are second highest and lower with respect to the uppermost electrical steel sheet. In this way, it can be said to be advisable to determine the arrangement of the materials having different degrees of hardness taking into account a magnetic flux density distribution under the condition of using the materials as the core.

The present invention is also applicable to a case where the number of electrical steel sheets, on which the punch processing is simultaneously performed, are three or more. When a difference is obtained between the degree of hardness of an electrical steel sheet that comes in contact with the die during the punch processing and the minimum value of the other electrical steel sheets, the difference only needs to fall within a range specified in the present invention, in order to obtain the effect of the present invention. In the present invention, the difference in Vickers hardness between the materials has been set to 10 HV or higher. The reason is the following. By sufficiently increasing the difference in Vickers hardness between an electrical steel sheet (a) on which the punch processing is performed while being in contact with the die or the punch and an electrical steel sheet (b) that is not in contact therewith, the amount of the generated burrs on the electrical steel sheet (b) is reduced, and the deterioration in the magnetic characteristics is prevented in the electrical steel sheets (a) and (b). From another point of view, to reduce the Vickers hardness of the electrical steel sheet (a) so as to prevent an excessive increase in load and wear of the die in the pressing process while limiting the amount of generation of the burrs of the electrical steel sheet (b) to a predetermined amount or lower, the Vickers hardness of the electrical steel sheet (a) only needs to be lower than that of the electrical steel sheet (b) by 10 HV or above. By setting such a condition, the core having target magnetic characteristics can be obtained while reducing the pressing load and the cost.

In the present invention, the Vickers hardness of the electrical steel sheets in the core that are not in contact with the die or the punch has been set to 180 HV or higher. By selecting this condition, even in the electrical steel sheets in which the generation of the burrs is not sufficiently restrained by being held by the die or the punch during the punch processing, the generation of the burrs is restrained to restrain the increase in the height of the burrs, and the deformation of the punched end portion can be restrained to prevent the deterioration in the magnetic characteristics.

EXAMPLES

Example 1

Regarding a stator core having a core outside diameter of 160 mm, a tooth width of 9 mm, a back yoke width of 9 mm, and a core height of 45 mm, two steel strip coils (steel sheet 1 (upper) and steel sheet 2 (lower): width 165 mm) illustrated in Table 1 below were delivered, and then stacked before reaching the entrance side of the pressing machine, and then, the stacked steel sheets were fed into the progressive die, and were subjected to a continuous punch processing to be produced as the stator core for a concentrated winding brushless DC motor. This stator core was wound with a wire, and incorporated into a motor case together with a rotor to be produced as the motor. The obtained motor was driven at 1500 rpm under a load of 3.0 Nm, and the input and the output of the motor were measured to evaluate a motor efficiency (%). The motor efficiency was obtained as a ratio of the output of the motor to the input power of the motor.

When the magnetic flux densities of various portions of the core were measured under the driving condition of the motor, the maximum magnetic flux density (average value over the entire width) of the tooth portion was 1.62 T, and the maximum magnetic flux density (average value over the entire width) of the back yoke portion was 1.0 T. Table 1 below illustrates comparison results of efficiencies of motors obtained using the cores made in various combinations of the steel strip coils. In Table 1, the hardness of the materials was measured as Vickers hardness (HV) under the condition of keeping applying a load of 1 kg for 10 seconds. An average core loss $W_{15/50}$ (W/kg) of the materials (core materials) was obtained as a core loss value weighted by the thickness. As illustrated in Table 1, for the motors using the cores produced under the condition (example) of the present invention, higher motor efficiencies were obtained for the average core losses of the core materials.

TABLE 1

| No. | Steel sheet 1 (upper) | | | Steel sheet 2 (lower) | | | Average core loss of core materials $W_{15/50}$ (W/kg) | Hardness difference (1 − 2) | Motor efficiency (%) | Remarks |
|---|---|---|---|---|---|---|---|---|---|---|
| | Thickness (mm) | Hardness (HV) | Core loss $W_{15/50}$ (W/kg) | Thickness (mm) | Hardness (HV) | Core loss $W_{15/50}$ (W/kg) | | | | |
| 1 | 0.20 | 180 | 2.10 | 0.20 | 180 | 2.10 | 2.10 | 0 | 90.1 | Comparative example (base) |
| 2 | 0.20 | 200 | 2.05 | 0.20 | 195 | 2.15 | 2.10 | 5 | 90.2 | Comparative example |
| 3 | 0.20 | 200 | 2.05 | 0.20 | 190 | 2.15 | 2.10 | 10 | 90.6 | Example |
| 4 | 0.20 | 200 | 2.04 | 0.20 | 180 | 2.22 | 2.13 | 20 | 91.4 | Example |
| 5 | 0.20 | 190 | 2.15 | 0.20 | 200 | 2.05 | 2.10 | −10 | 90.2 | Comparative example |
| 6 | 0.20 | 180 | 2.22 | 0.20 | 200 | 2.04 | 2.13 | −20 | 90.2 | Comparative example |
| 7 | 0.20 | 180 | 2.36 | 0.20 | 180 | 2.33 | 2.35 | 0 | 89.6 | Comparative example |
| 8 | 0.20 | 190 | 2.08 | 0.20 | 150 | 2.64 | 2.36 | 40 | 90.0 | Example |
| 9 | 0.20 | 170 | 2.19 | 0.20 | 155 | 2.59 | 2.39 | 15 | 89.7 | Comparative example |
| 10 | 0.15 | 200 | 2.04 | 0.25 | 180 | 2.26 | 2.18 | 20 | 91.6 | Example |
| 11 | 0.25 | 205 | 2.21 | 0.20 | 190 | 2.15 | 2.18 | 15 | 91.7 | Example |
| 12 | 0.25 | 190 | 2.24 | 0.20 | 210 | 2.01 | 2.14 | −20 | 90.0 | Comparative example |

Example 2

Regarding the stator core having the core outside diameter of 160 mm, the tooth width of 9 mm, the back yoke width of 5 mm, and the core height of 45 mm, two steel strip coils (steel sheet 1 (upper) and steel sheet 2 (lower): width 165 mm) illustrated in Table 2 below were delivered, and then stacked before reaching the entrance side of the pressing machine, and then, the stacked steel sheets were fed into the progressive die, and were subjected to the continuous punch processing to be produced as the stator core for the concentrated winding brushless DC motor. This stator core was wound with a wire, and incorporated into the motor case together with the rotor to be produced as the motor. The obtained motor was driven at 1500 rpm under a load of 3.0 Nm, and the input and the output of the motor were measured to evaluate the motor efficiency (%). The motor efficiency was obtained as a ratio of the output of the motor to the input power of the motor.

When the maximum magnetic flux densities of various portions of the core were measured under the driving condition of the motor, the maximum magnetic flux density (average value over the entire width) of the tooth portion was 1.62 T, and the maximum magnetic flux density (average value over the entire width) of the back yoke portion was 1.8 T. Table 2 below illustrates comparison results of efficiencies of motors obtained using the cores made in various combinations of the steel strip coils. In Table 2, the hardness of the materials was measured as Vickers hardness (HV) under the condition of keeping applying a load of 1 kg for 10 seconds. The average core loss $W_{15/50}$ (W/kg) of the materials (core materials) was obtained as a core loss value weighted by the thickness. As illustrated in Table 2, for the motors (example) in which the magnetic flux density of the back yoke portion is higher, the motor efficiency was verified to be improved by increasing the hardness of the steel sheet on the lower side.

TABLE 2

| No. | Steel sheet 1 (upper) | | | Steel sheet 2 (lower) | | | Average core loss of core materials $W_{15/50}$ (W/kg) | Hardness difference (2 − 1) | Motor efficiency (%) | Remarks |
|---|---|---|---|---|---|---|---|---|---|---|
| | Thickness (mm) | Hardness (HV) | Core loss $W_{15/50}$ (W/kg) | Thickness (mm) | Hardness (HV) | Core loss $W_{15/50}$ (W/kg) | | | | |
| 1 | 0.25 | 190 | 2.23 | 0.25 | 190 | 2.23 | 2.23 | 0 | 89.3 | Comparative example |
| 2 | 0.25 | 190 | 2.23 | 0.25 | 195 | 2.22 | 2.23 | 5 | 89.3 | Comparative example |
| 3 | 0.25 | 180 | 2.27 | 0.25 | 200 | 2.16 | 2.22 | 20 | 89.9 | Example |
| 4 | 0.25 | 180 | 2.35 | 0.25 | 220 | 2.09 | 2.22 | 40 | 90.4 | Example |
| 5 | 0.25 | 190 | 2.21 | 0.25 | 180 | 2.27 | 2.24 | −10 | 89.1 | Comparative example |
| 6 | 0.25 | 210 | 2.20 | 0.25 | 180 | 2.23 | 2.22 | −30 | 89.2 | Comparative example |
| 7 | 0.25 | 190 | 2.21 | 0.15 | 210 | 2.04 | 2.15 | 20 | 90.1 | Example |
| 8 | 0.15 | 190 | 2.07 | 0.25 | 210 | 2.17 | 2.13 | 20 | 90.3 | Example |

Example 3

Regarding the stator core having the core outside diameter of 160 mm, the tooth width of 9 mm, the back yoke width of 9 mm, and the core height of 45 mm, three steel strip coils (steel sheets 1 to 3 (upper, middle, and lower): width 165 mm) illustrated in Table 3 below were delivered, and then stacked before reaching the entrance side of the pressing machine, and then, the stacked steel sheets were fed into the progressive die and were subjected to the continuous punch processing to be produced as the stator core for the concentrated winding brushless DC motor. This stator core was wound with a wire, and incorporated into the motor case together with the rotor to be produced as the motor. The obtained motor was driven at 1500 rpm by a sinusoidal pulse width modulated (PWM) voltage waveform under a load of 3.0 Nm, and the input and the output of the motor were measured to evaluate the motor efficiency (%). The motor efficiency was obtained as a ratio of the output of the motor to the input power of the motor.

When the maximum magnetic flux densities of various portions of the core were measured under the driving condition of the motor, the maximum magnetic flux density (average value over the entire width) of the tooth portion was 1.62 T, and the maximum magnetic flux density (average value over the entire width) of the yoke portion was 1.0 T. Table 3 illustrates comparison results of efficiencies of motors obtained using the cores made in various combinations of the steel strip coils. In Table 3 below, the hardness of the materials was measured as Vickers hardness (HV) under the condition of keeping applying a load of 1 kg for 10 seconds. The average core loss $W_{15/50}$ (W/kg) of the materials (core materials) was obtained as a core loss value weighted by the thickness. As illustrated in Table 3, for the motors using the cores produced under the condition (example) of the present invention, higher motor efficiencies were verified to be obtained for the average core losses of the core materials.

REFERENCE SIGNS LIST 1a, 1b Electrical steel sheet
2 Die
3 Punch
11 Tooth portion
12 Slot portion
13 Central portion
14 Back yoke portion
15 Core segment
16 Laminated core
17 Scrap
S Base material

The invention claimed is:

1. A punch processing method for electrical steel sheets to manufacture core segments comprising:

stacking a plurality of electrical steel sheets; and punching out the plurality of electrical steel sheets in a stacked state simultaneously to manufacture the core segments, wherein in a case where the core segments are applied to a stator core in which a maximum magnetic flux density at a tooth portion is to be higher than a maximum magnetic flux density at a back yoke portion, degrees of Vickers hardness of an electrical steel sheet located second from a bottom side in the stacked state and an electrical steel sheet located above the electrical steel sheet located second from the bottom side in the stacked state are set to 180 HV or higher, and 10 HV or higher than a value of degree of Vickers hardness of an electrical steel sheet located on the bottom side in the stacked state.

2. A method of manufacturing a laminated core, the method comprising:

laminating the core segments manufactured by the punch processing method according to claim 1; and integrating the laminated core segments.

TABLE 3

| No. | Steel sheet 1 (upper) | | | Steel sheet 2 (middle) | | | Steel sheet 3 (lower) | | | Average core loss of core materials $W_{15/50}$ (W/kg) | Hardness difference Min(1, 2) − 3 | Motor efficiency (%) | Remarks |
|---|---|---|---|---|---|---|---|---|---|---|---|---|---|
| | Thickness (mm) | Hardness (HV) | Core loss $W_{15/50}$ (W/kg) | Thickness (mm) | Hardness (HV) | Core loss $W_{15/50}$ (W/kg) | Thickness (mm) | Hardness (HV) | Core loss $W_{15/50}$ (W/kg) | | | | |
| 1 | 0.20 | 180 | 2.10 | 0.20 | 180 | 2.10 | 0.20 | 180 | 2.1 | 2.10 | 0 | 90.0 | Comparative example (base) |
| 2 | 0.20 | 200 | 2.05 | 0.20 | 190 | 2.15 | 0.20 | 185 | 2.1 | 2.10 | 5 | 90.1 | Comparative example |
| 3 | 0.20 | 200 | 2.05 | 0.20 | 190 | 2.15 | 0.20 | 180 | 2.1 | 2.10 | 10 | 90.6 | Example |
| 4 | 0.20 | 210 | 2.03 | 0.20 | 200 | 2.19 | 0.20 | 180 | 2.1 | 2.11 | 20 | 91.4 | Example |
| 5 | 0.20 | 210 | 2.15 | 0.20 | 210 | 2.05 | 0.20 | 180 | 2.1 | 2.10 | 30 | 91.6 | Example |
| 6 | 0.15 | 200 | 2.10 | 0.15 | 210 | 2.03 | 0.20 | 180 | 2 2 | 2.12 | 20 | 91.2 | Example |

INDUSTRIAL APPLICABILITY

The present invention can provide a punch processing method for electrical steel sheets and a method for manufacturing a laminated core that are capable of restraining the increase in the burrs that leads to the deterioration in the magnetic characteristics.